July 30, 1946.  W. C. RUDD  2,404,987
INDUCTION HEATING AND QUENCHING DEVICE
Filed April 19, 1944  4 Sheets-Sheet 1

INVENTOR.
WALLACE C. RUDD.
BY
Ward Crosby + Neal
ATTORNEYS.

July 30, 1946.    W. C. RUDD    2,404,987
INDUCTION HEATING AND QUENCHING DEVICE
Filed April 19, 1944    4 Sheets-Sheet 2
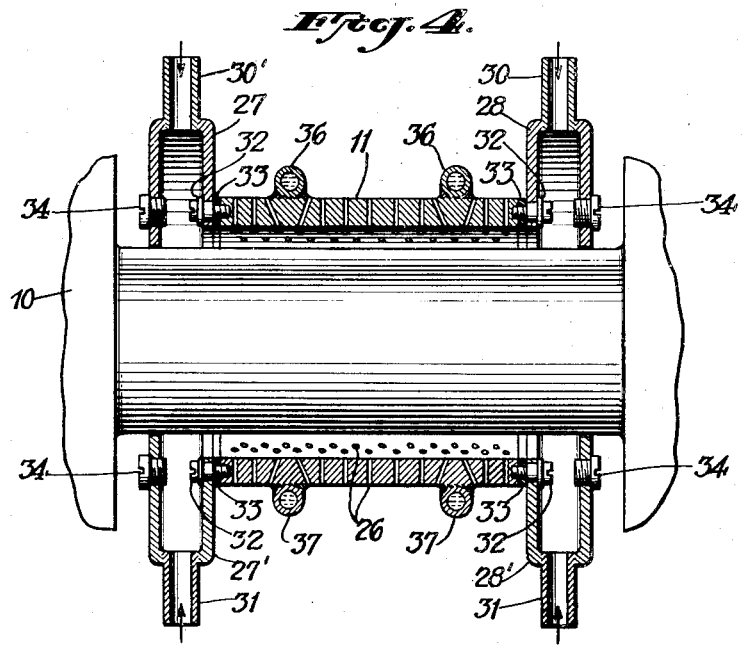
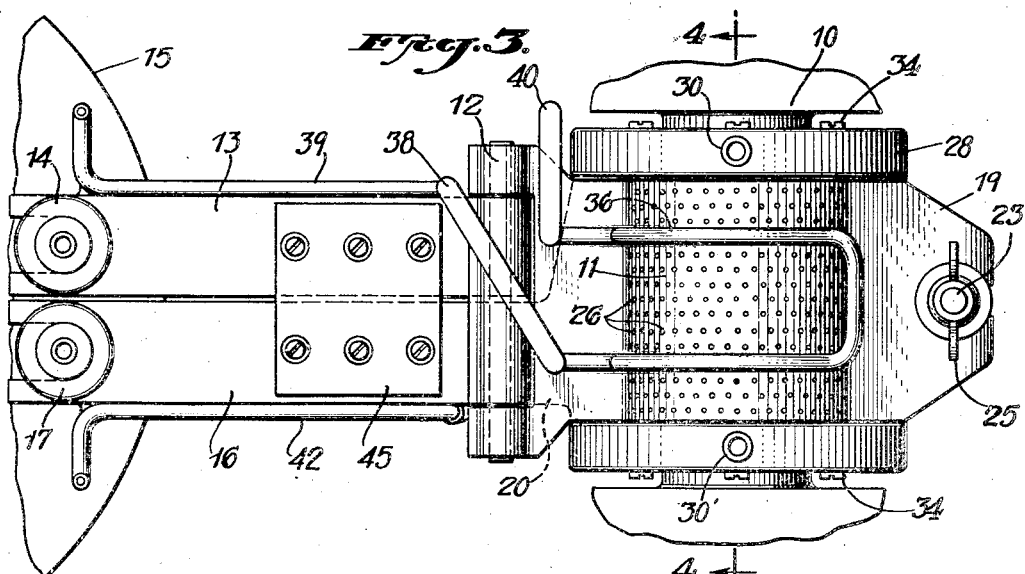
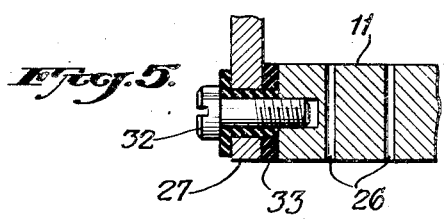
INVENTOR.
WALLACE C. RUDD.
BY
Ward, Crosby & Neal
ATTORNEYS.

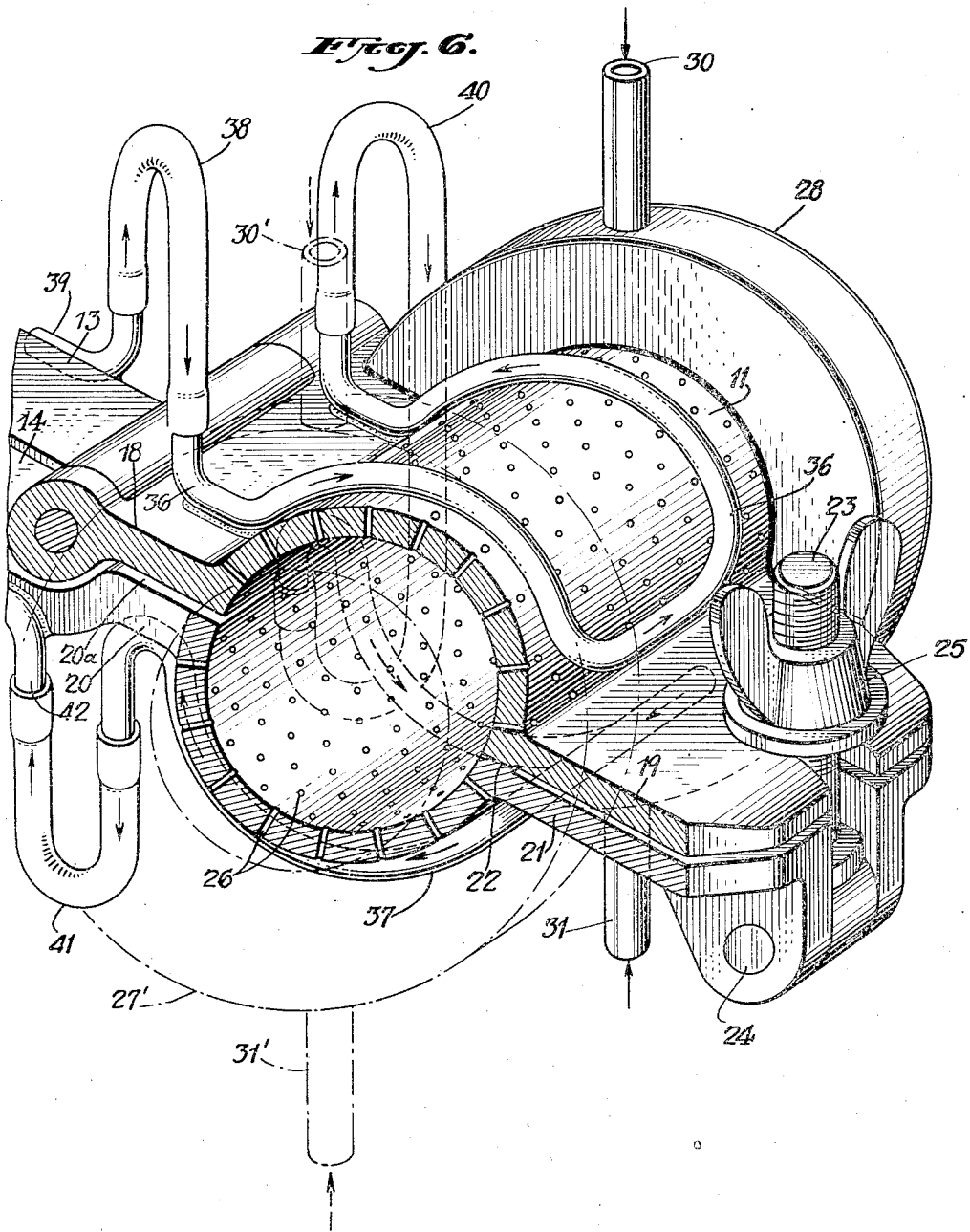

July 30, 1946.   W. C. RUDD   2,404,987
INDUCTION HEATING AND QUENCHING DEVICE
Filed April 19, 1944   4 Sheets-Sheet 4

INVENTOR.
WALLACE C. RUDD.
BY
Ward, Crosby + Neal
ATTORNEYS.

Patented July 30, 1946

2,404,987

UNITED STATES PATENT OFFICE 2,404,987

INDUCTION HEATING AND QUENCHING DEVICE

Wallace C. Rudd, Larchmont, N. Y., assignor to Induction Heating Corp., New York, N. Y., a corporation of New York Application April 19, 1944, Serial No. 531,730

1 Claim. (Cl. 266—4)

This invention relates to improved methods and apparatus for induction heating and quenching of metal objects and surfaces thereof which are desired to be heat-treated.

It is now common practice to surface-harden or otherwise heat-treat objects such as portions of shafts, gears, cams, etc., by surrounding the surfaces to be treated with an inductor element in spaced relation thereto, and carrying high frequency current such as to quickly heat the surfaces. It is sometimes the practice to move the object after it has been thus heated to the desired temperature, to another position where quenching liquid is applied. In other cases it is the practice to quench before the object is moved from heating position, as by introducing water from cooling cavities in the inductor, through perforations into the clearance space between the inductor and the object. The latter method has the advantage of permitting heating and quenching in rapid succession, which is sometimes important for best results. The latter method is also advantageous for the heat-treating of objects such as crank shafts which cannot be readily and quickly moved longitudinally out of the inductor and into a quenching device. However, if the quenching liquid, such as the inductor cooling water, is introduced as through perforations from the cooling cavity in the inductor, into the clearance space between the inductor and object, the resulting mixture of liquid and bubbles of gases and vapor may under certain circumstances result in non-uniform or somewhat ineffective quenching, since the gases and vapors and the heat thereof are confined and have to be conducted along the surface being treated to the perimeter of the inductor area before escaping. That is, since the quenching liquid has to be introduced through the perforations under considerable pressure, the perforations are not available as escape channels for the gases and vapors; instead the incoming forceful jets of liquid may cause pockets of gases and vapors to be momentarily retained just at the areas where it is desired to quickly and uniformly apply liquid alone.

According to the present invention, the above-noted difficulties are avoided by introducing into the space between the active inductor area and the object to be treated, quenching liquid which is forced in from the perimeter of such area in a direction so that it may immediately spread over the area being treated, and whereby the resulting gases or vapors are free of escape through perforations distributed over the inductor area. In short, instead of injecting the quenching liquid through the perforations or apertures, these are left available for the prompt escape of steam, air or vapors which might otherwise be pocketed to prevent and interfere with the desired quenching action.

Various further and more specific objects, features and advantages of the invention will appear from the description given below taken in connection with the accompanying drawings illustrating by way of example preferred forms of the invention. The invention consists in such novel features and combinations as may be shown and described in connection with the apparatus herein disclosed, and also such novel methods as are disclosed herein.

In the drawings:

Fig. 3 is a top view.

Fig. 4 is a sectional view taken substantially along the line 4—4 of Fig. 3.

Fig. 5 is an enlarged sectional view showing certain details.

Fig. 6 is a perspective view of a device the same as or similar to that of Figs. 1-4, and Figs. 7 and 8 are vertical sectional views respectively of two alternative forms of the invention.

Figure 1:
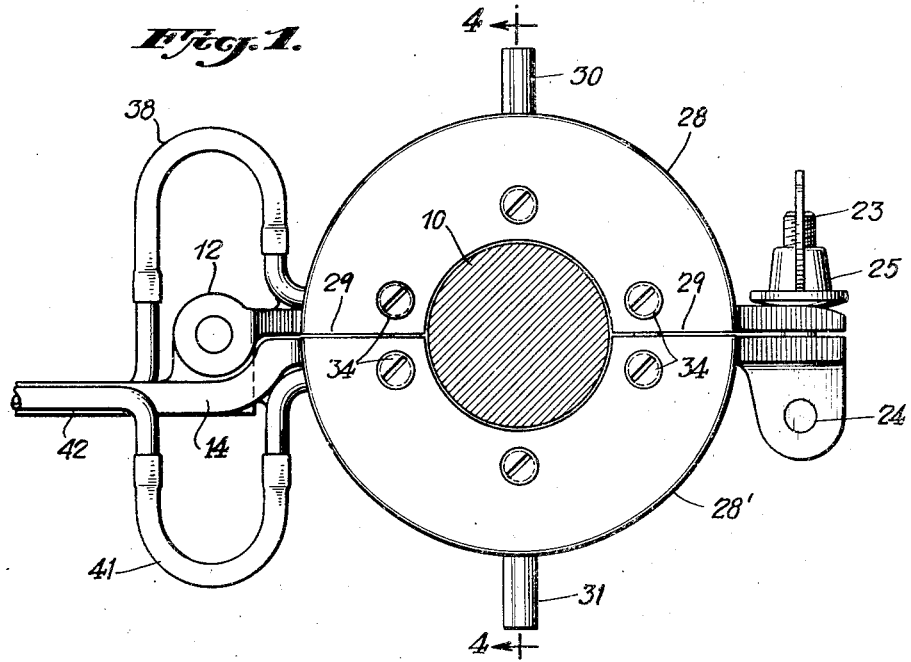
Fig. 1 is a side elevational view of one embodiment of the invention.

Referring to Figs. 1-4 and 6, an object to be heat-treated such as a portion of a crank shaft is indicated at 10, the same being encircled in spaced relation by an inductor device 11 formed for example of upper and lower semi-cylindrical portions, the upper portion being connected by a suitable hinge as at 12 to a conductor supporting bar as at 13 mounted at one of the secondary terminals, for example as at 14, of a high frequency transformer 15. The lower half of the inductor may be rigidly supported as by a conductor bar 16 extending along in closely spaced relation to the bar 13 and supported for example as at the other secondary terminal 17 of the transformer.

Figure 2:
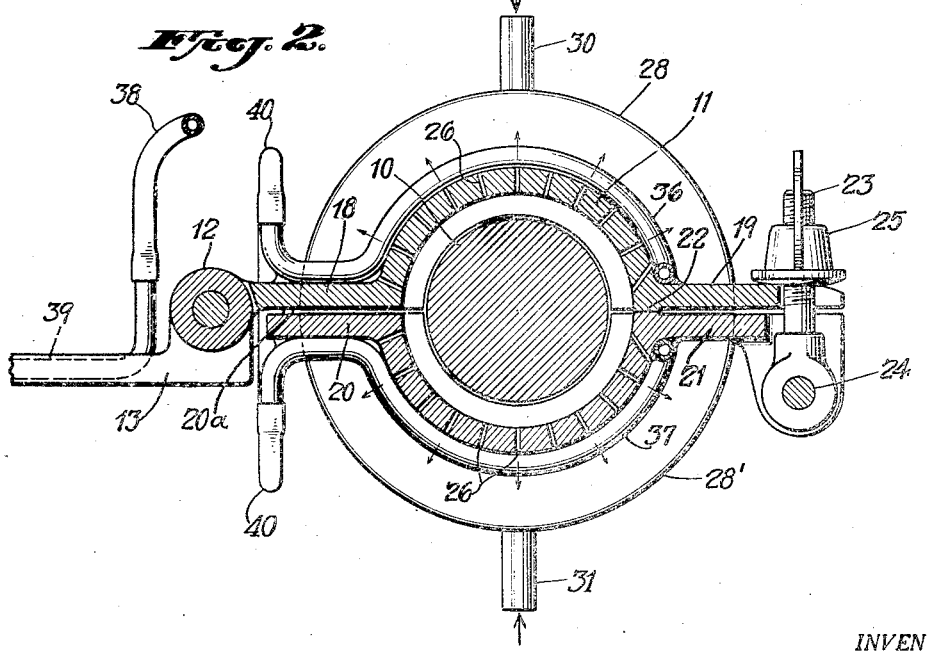
Fig. 2 is a vertical sectional view of the same device.

As best shown in Figs. 2 and 6, the upper and lower portions of the inductor may be formed respectively with flanges as at 18, 19 and 20, 21. As indicated by the dotted lines in Fig. 3, flange 20 may be rigidly and integrally formed with the conductor bar 16. Flange 18, on the other hand, may as shown in Fig. 3 be integrally formed with portions of the hinge means 12. The flanges 18 and 20 as shown in Figs. 2 and 6 are so shaped and positioned normally as to be spaced apart by a narrow gap 20a. The flanges 19 and 21, on the other hand, at least along their inner edges, are adapted to be brought into contact as at 22. The outer edges of flanges 19 and 21 are adapted to be releasably clamped together as by a suitable clamping screw 23 pivotally mounted as at 24 in suitable bosses formed on flange 21, and provided with a thumb nut 25. It will be apparent that the inductor may be opened up by releasing thumb screw 25, and by swinging the upper half about hinge 12, thus permitting the work piece to be put in place or removed.

In a typical case, the flanges 18 and 20 may be spaced apart by about 1/32" for example, and the inner surface of the inductor 11 may be spaced from the surface of the work 10 with a clearance of about 1/8 or 1/10".

The areas of the inductor which encircle the work as shown, may be formed with numerous perforations or apertures distributed thereover for the purposes above indicated. In a typical case, as where the clearance between the inductor and the work is about 1/8" for example, these perforations may be of a diameter of about 1/8" with spacings from center to center of about 1/4" for example. Thus, if quenching liquid is introduced into the work clearance space from an edge or perimeter of the inductor (or from either or both sides) this liquid is free to uniformly and promptly flow over all of the heated surface areas of the work substantially without obstruction due to any evolved vapors or air present, as the vapor and air are free to escape immediately through the perforations from above all of the hot surface areas of the work.

The quenching liquid may be introduced into the clearance space by various means such as jets projected in directions along the shaft shown in Figs. 1–4. However, means are preferably provided such as shown in Fig. 4 for insuring more uniform and forceful injection of the quenching liquid. As here shown, pairs of complementary semi-annular hollow members 27, 27' and 28, 28' are mounted respectively on the side edges of the inductor portions. That is, as shown in Fig. 1, the semi-annular member 28 may be mounted on the upper half of the inductor so as to have its lower edges as at 29 extend down to a close position with respect to the corresponding upper edges of the lower semi-annular member 28'. Thus the cavities within members 28, 28' jointly form an annular space to which the quenching liquid may be introduced under pressure through conduit connection means as at 30 and 31. The adjacent edges at 29 of the members 28, 28' are spaced slightly so that the same are so arranged as to be normally insulated from each other and thus not provide a closed circuit subject to the inductive field. It will be apparent that the members 27 and 27' may be constructed and arranged in a manner similar to the members 28 and 28'. As shown in Figs. 4 and 5, the inner sides of these members may be secured as by screws 32 to the side edges of the inductor, suitable heat resistant insulation means, such as a mica composition, as at 33 being provided for the screws as well as for insulating the inductor from members 27, 28 and 27', 28'. In order to gain access to such screws, the members 27, 28, etc., may have their outer walls formed with apertures normally closed by screws as at 34 (Fig. 4).

As best shown in Fig. 6, the upper and lower portions of the inductor may be provided with cooling fluid conduit means as at 36 and 37, for example in the form of copper tubes brazed in position after being bent to suitable shapes such as will be readily apparent from Fig. 6. One end of tube 36 may be connected as by, for example, conduit 38 to a tube 39 extending back along the bar 13 for connection to a suitable source of cooling fluid. The cooling fluid from such source may flow in the conduit along the bar 13 to cool same, thence through flexible connection 38 and conduit 36 around the surface of the upper half of the inductor, and then through a flexible conduit as at 40 down to and through conduit 37 for cooling the lower half of the inductor. The other end of conduit 37 may lead through a connection 41 to a tube 42 extending along bar 16 and thence to a discharge point or to other apparatus to be cooled. The flexible connections above referred to and as shown are adapted of course to permit the upper half of the inductor to be swung upwardly when the thumb screw 23 is released, to permit the work to be put in place or removed.

The above-described arrangement for permitting application of cooling fluid through the conduits 36 and 37 independently of the quenching fluid, has the advantage of insuring proper cooling of the inductor parts at all times regardless of the frequency or duration of the quenching operations and without interference therewith.

As shown in Fig. 3, an insulation piece 45 may be affixed to the bars 13 and 16 to retain same in proper relative position.

Figure 7:
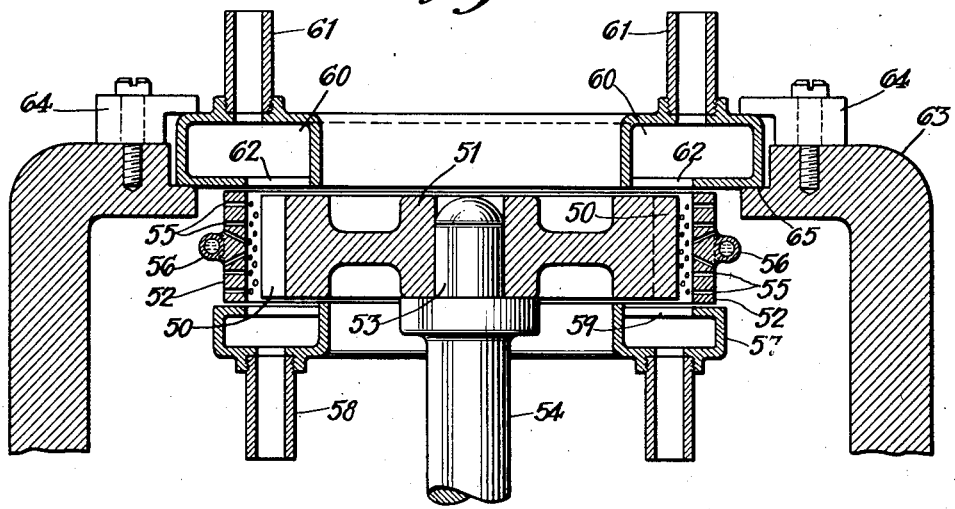

The apparatus of Fig. 7 is adapted for example for heat-treating teeth as at 50 around the periphery of a gear member 51. Here the inductor may comprise a member 52 encircling the gear with desired clearance and having its terminals connected to a suitable source of high frequency current (not shown) in a manner similar to the connections for the device of Figs. 1 and 6, although in this case the inductor does not need to be formed with any hinge means. The gear 51 or other work piece may be slid downwardly into position on a boss 53 formed on the upper end of a rotatable shaft 54. This shaft may be driven by suitable means so as to rotate the gear within the inductor during the heat treatment and quenching and thus insure uniform treatment around the periphery regardless of any variations in the clearance or other conditions. The inductor may be formed with perforations as at 55 for the same purpose as the perforations 26 above described. Also the inductor may be encircled by a cooling fluid conduit as at 56 brazed or soldered thereto. For introducing quenching liquid from below, a stationary annular hollow member 57 may be provided connected, for example, to water inlets as at 58 and having at its upper side a wide annular opening 59 for affording access of the cooling fluid to the tooth areas on the gear.

At the upper side of the inductor another hollow annular member 60 may be provided for applying quenching water coming in through conduits 61, to the upper perimeter of the gear member; access of the water to the work being had through an annular opening as at 62 from the cavity of the member 60. The member 60 in this construction is adapted to be removably supported, for example, on a housing or frame member 63, removable clamping means as at 64 being provided for retaining the member 60 down against an internal flange 65 within the opening of the housing. It will be apparent that upon unclamping and removing the member 60 and its water connections which may be flexible, access may be readily had to the interior of the inductor for putting into position or taking out the work piece.

Figure 8:
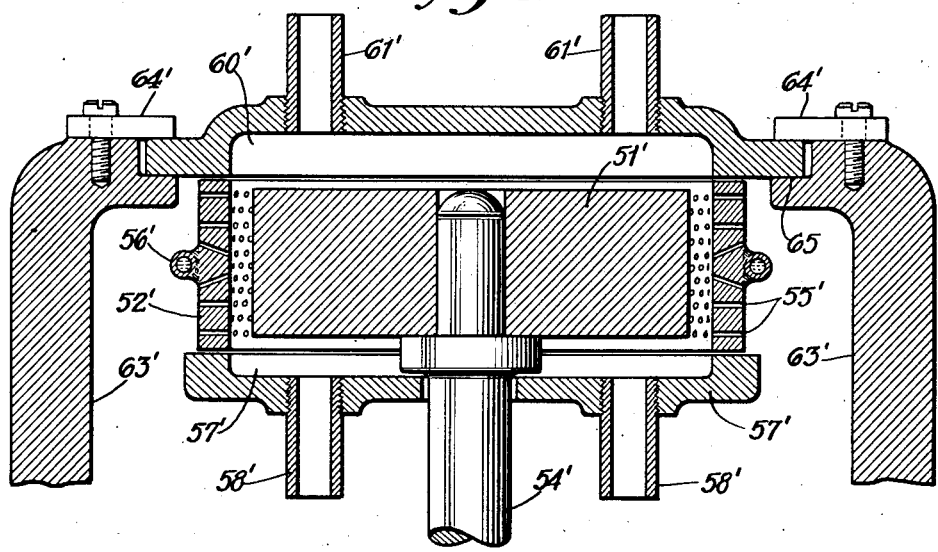

The embodiment shown in Fig. 8 is similar to that of Fig. 7 except that means is here provided for applying quenching water throughout the upper and lower surface areas of a work piece as at 51' as well as to its peripheral areas. Corresponding parts in Figs. 7 and 8 respectively are identified by the same numerals accompanied by prime marks.

The metal parts of the above described apparatus should, of course, be preferably made of non-magnetic material to minimize induction heating losses.

Tests have shown that with the above-described apparatus embodying the invention, the surface-hardening operations may be rapidly and efficiently performed with the desired areas hardened to an unusual degree of uniformity and thoroughness. The structures have a number of important advantages in addition to those above noted. For example, the open perforations or apertures in the inductor parts afford opportunity for the operator to examine the work piece surface during the heating operation and estimate its temperature, as indicated by the color. The inductor is simple to manufacture, in that no problems are involved in forming the perforations in proper communication with any cooling fluid cavities as in prior constructions. The perforations may be drilled through the inductor metal while same is in flat condition and before being shaped to semi-cylindrical form.

Since quenching fluid may be introduced with the above described apparatus uniformly through large annular openings into each side of the inductor, the quenching effect on the desired areas is uniform, and so-called "pin point" quenching as would sometimes occur in introducing the liquid through perforations, is entirely avoided.

When the apparatus is used as in Fig. 4, for example, for heat-treating crank shafts, the water chamber members as at 27, 28 at each side of the inductor may be used in effect as spacer means for positioning and locating the inductor at the desired central region to be heat-treated.

While the invention has been described in detail with respect to particular preferred examples, it will be understood by those skilled in the art after understanding the invention, that various changes and further modifications may be made without departing from the spirit and scope of the invention, and it is intended therefore in the appended claim to cover all such changes and modifications.

What is claimed as new and desired to be secured by Letters Patent is:

Induction heating and quenching apparatus comprising a single turn inductor constructed and arranged for connection to a source of high frequency current and having a generally annular internal surface area for extending around and in spaced relation to objects to be heated when positioned axially therein, said surface area being formed with perforations distributed substantially throughout the area for bringing the space between the inductor and object into communication at numerous points with the external atmosphere, generally annular chamber means insulated from the inductor and mounted on an end thereof for extending around the object to be heated and formed with a generally annular outlet communicating freely with said space, outer wall portions of said chamber means being shaped to closely embrace the object and thus close off the outer side of the chamber and provide means for positioning the object within the inductor, means for introducing into said chamber a forceful stream of quenching fluid to flow from the chamber as an axially moving annular stream substantially uniformly covering the surfaces of the object and whereby resulting vapor is free to pass out through said perforations, the inductor and chamber assembly being formed of two separable segments permitting opening thereof to introduce or remove the objects, and clamping means for removably securing such segments together.

WALLACE C. RUDD.